US010377358B2

(12) United States Patent
Pennala et al.

(10) Patent No.: US 10,377,358 B2
(45) Date of Patent: Aug. 13, 2019

(54) METHODS OF LEARNING LONG TERM BRAKE CORNER SPECIFIC TORQUE VARIATION

(71) Applicant: GM GLOBAL TECHNOLOGY OPERATIONS LLC, Detroit, MI (US)

(72) Inventors: Brandon C. Pennala, Howell, MI (US); Eric E. Krueger, Chelsea, MI (US); Patrick J. Monsere, Highland, MI (US); Edward T. Heil, Howell, MI (US); Robert L. Nisonger, Milford, MI (US); Constandi J. Shami, Ann Arbor, MI (US); Alan J. Houtman, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 15/410,598

(22) Filed: Jan. 19, 2017

(65) Prior Publication Data

US 2018/0201243 A1 Jul. 19, 2018

(51) Int. Cl.

| | |
|---|---|
| ***B60T 8/32*** | (2006.01) |
| ***B60T 8/17*** | (2006.01) |
| ***B60T 8/172*** | (2006.01) |
| ***B60T 8/18*** | (2006.01) |
| ***B60T 13/66*** | (2006.01) |
| ***B60T 17/22*** | (2006.01) |

(52) U.S. Cl.

CPC ............ *B60T 8/321* (2013.01); *B60T 8/1701* (2013.01); *B60T 8/172* (2013.01); *B60T 8/18* (2013.01); *B60T 13/66* (2013.01); *B60T 17/22* (2013.01); *B60T 2270/86* (2013.01)

(58) Field of Classification Search

CPC ........ B60T 8/321; B60T 8/1701; B60T 8/172; B60T 8/18; B60T 17/22; B60T 2270/86

See application file for complete search history.

(56) References Cited

U.S. PATENT DOCUMENTS

| | | | | |
|---|---|---|---|---|
| 5,132,906 A * | 7/1992 | Sol | B60T 8/172 180/197 |
| 2006/0049690 A1* | 3/2006 | Collins | B60T 13/72 303/114.3 |
| 2007/0096547 A1* | 5/2007 | Gritt | B60T 17/22 303/1 |
| 2010/0114447 A1* | 5/2010 | Moriki | B60K 6/442 701/74 |
| 2017/0102293 A1* | 4/2017 | Singh | G01M 17/02 |

* cited by examiner

*Primary Examiner* — Thomas E Worden
(74) *Attorney, Agent, or Firm* — Lorenz & Kopf, LLP

(57) ABSTRACT

Systems and methods are provided for controlling a vehicle using a specific torque of a brake system. In one embodiment, a method of using a specific torque of a brake system for a vehicle includes: determining a brake pressure of the brake system during a braking operation; determining a deceleration of the vehicle during the braking operation; determining a vehicle mass and a wheel radius; estimating a specific torque of the brake system based on the brake pressure and the deceleration; and operating the vehicle based on the specific torque.

18 Claims, 5 Drawing Sheets

METHODS OF LEARNING LONG TERM BRAKE CORNER SPECIFIC TORQUE VARIATION

TECHNICAL FIELD

The present disclosure generally relates to autonomous vehicles, and more particularly relates to systems and methods for brake corner specific torque variation in an autonomous vehicle.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some of the vehicle automation relies on converting a brake torque request (e.g., a requested deceleration rate or a requested brake torque value) into a hydraulic brake pressure in the braking system. The relationship between the actual brake torque and the brake pressure is known as specific torque. The specific torque is generally based on original equipment manufacturer (OEM) brake hardware in a non-worn condition. The actual specific torque of a system, however, may vary from the OEM brake hardware in a non-worn condition. For example, aftermarket brake hardware may have a specific torque that varies by more than 20% from the OEM brake hardware. Furthermore, wear on brake pads and rotors and environmental changes such as temperature and humidity may impact the specific torque of the braking system.

Accordingly, it is desirable to provide systems and methods that allow the brake control system to adapt to long term changes in specific torque. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for controlling a vehicle using a specific torque of a brake system. In one embodiment, a method of using a specific torque of a brake system for a vehicle includes: determining a brake pressure of the brake system during a braking operation; determining a deceleration of the vehicle during the braking operation; determining a vehicle mass and a wheel radius; estimating a specific torque of the brake system based on the brake pressure, the vehicle mass, the wheel radius, and the deceleration; and operating the vehicle based on the specific torque.

In one embodiment, a vehicle system for controlling a vehicle with a brake system includes a sensor system, a brake pressure module, a torque estimation module, and a brake system. The sensor system is configured for determining a vehicle mass, a wheel radius, and a deceleration of the vehicle during the braking operation. The brake pressure module is configured for determining a brake pressure of the brake system during a braking operation. The torque estimation module is for estimating a specific torque of the brake system based on the brake pressure, the vehicle mass, the wheel radius, and the deceleration. The brake system is configured for operating the vehicle based on the specific torque.

In one embodiment, a vehicle includes a sensor system, a control system, and a braking system. The sensor system is configured for determining a vehicle mass, a wheel radius, and a deceleration of the vehicle during the braking operation. The control system includes a brake pressure module configured for determining a brake pressure of the brake system during a braking operation. The control system further includes a torque estimation module for estimating a specific torque of the brake system based on the brake pressure, the vehicle mass, the wheel radius, and the deceleration. The brake system is configured for operating the vehicle based on the specific torque.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
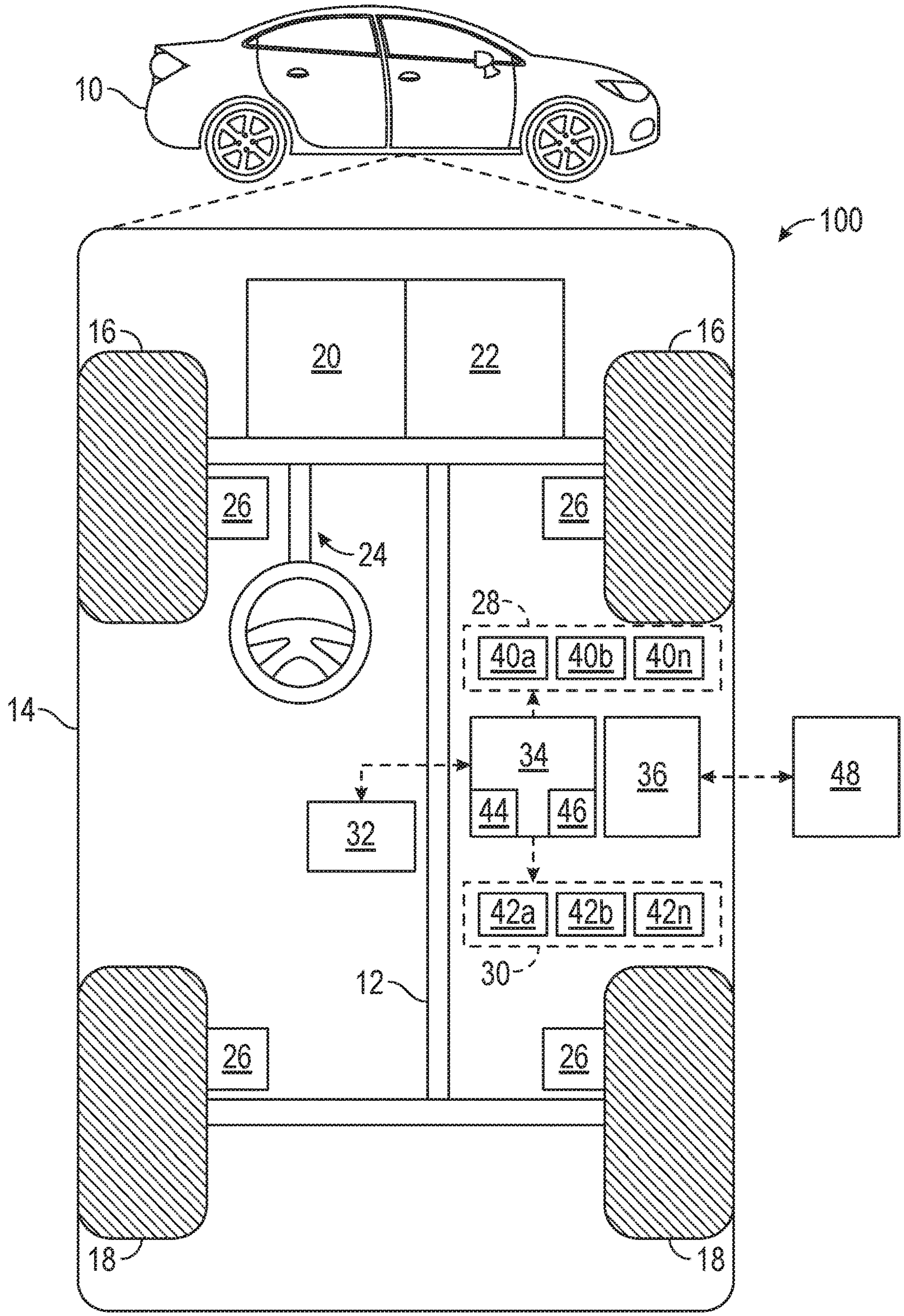
FIG. 1 is a functional block diagram illustrating an autonomous vehicle having a control system, in accordance with various embodiments.

With reference to FIG. 1, a control system shown generally at 100 is associated with a vehicle 10 in accordance with various embodiments. In general, control system 100 estimates and learns an actual specific torque of vehicle 10 to provide consistent braking performance when faced with long term wear and/or aftermarket brake hardware.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, and/or other sensors. The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 100 and, when executed by the processor 44, predict the road surface friction coefficient μ. For example, the instructions may approximate surface μ based on sensor input and real-time weather data to adjust path planning, calculate safe stopping distances, predict evasive maneuver capability, and change chassis controls systems proactively.

Figure 2:
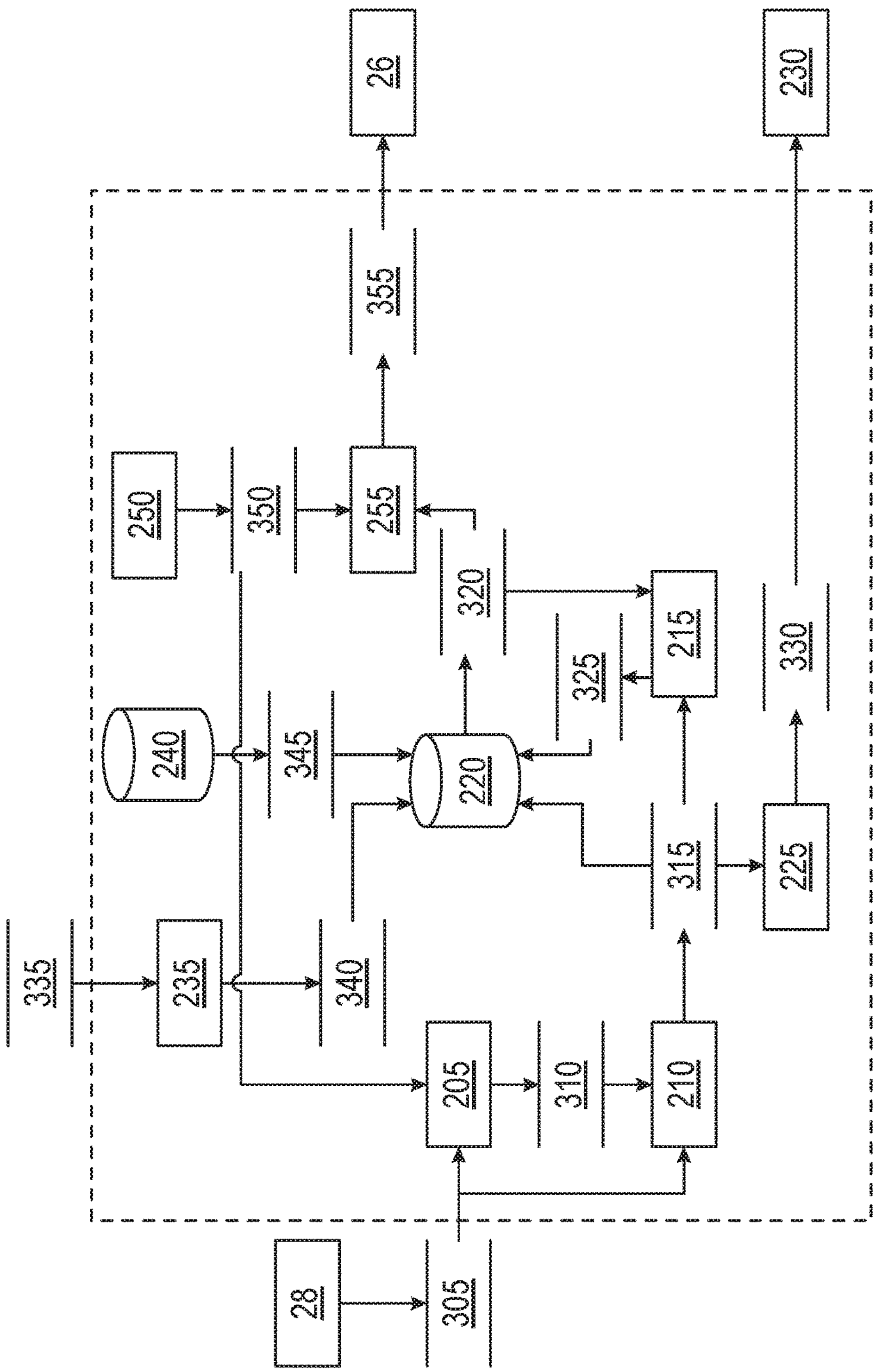
FIG. 2 is a dataflow diagram illustrating a control system of the autonomous vehicle, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Referring now to FIG. 2, and with continued reference to FIG. 1, a dataflow diagram illustrates various embodiments of the control system 100, which may be embedded within the controller 34. Various embodiments of the control system 100 according to the present disclosure may include any number of sub-modules embedded within the controller 34. As can be appreciated, the sub-modules shown in FIG. 2 may be combined and/or further partitioned to similarly control the vehicle 10. Inputs to the control system 100 may be received from the sensor system 28, received from other control modules (not shown) associated with the vehicle 10, received from the communication network 56 at the communication system 36, and/or determined/modeled by other sub-modules (not shown) within the controller 34. In various embodiments, the control system 100 includes a qualifying brake apply module 205, a torque estimation module 210, a threshold comparison module 215, a current specific torque database 220, a fault indication module 225, a service reset module 235, an initial specific torque database 240, a brake torque request module 250, and a brake pressure module 255.

Generally, control system 100 is configured to reduce performance variation of a braking system due to long term changes in vehicle level specific torque. Specific torque is the relationship between brake pressure and brake torque. Specific torque changes in the braking system are gradually learned by monitoring the brake pressure to vehicle deceleration relationship under certain conditions. Accordingly, control system 100 is able to control electrohydraulic brake systems to provide increased torque accuracy during driver applied and autonomous braking events.

Qualifying brake apply module 205 is configured to receive vehicle condition data 305 from sensor system 28, to receive brake torque request 350, and to generate brake apply qualification determination 310. In the example provided, vehicle condition data 305 includes vehicle deceleration, a brake temperature estimate, ambient humidity, a rain sensor or wiper status, a vehicle mass estimate, a wheel radius, a road grade estimate, a surface friction coefficient estimate, and a brake burnish status. Vehicle condition data 305 may be measured directly or may be estimated based on measurements. For example, vehicle deceleration may be estimated based on wheel speed sensor data or may be measured with an accelerometer. In some embodiments, the brake burnish status is estimated based on the nature of brake torque requests since the last brake hardware change. In the example provided, the wheel effective radius estimate is an estimated effective wheel radius based on a tire pressure measurement from a Tire Pressure Monitoring System.

In some embodiments, the sensors used for autonomous driving (e.g., LIDAR sensors, RADAR sensors, Global Navigation Satellite System (GNSS) receivers, etc.) may be utilized for the estimates and/or measurements. For example, the sensors may be used to count the number of and measure the size of people and items entering and exiting the vehicle. The vehicle may then estimate the mass of the people and the items using a basic estimate of the density of the people and the items. The mass of the people and items in the vehicle may then be added to the mass of the vehicle when empty to achieve a vehicle mass estimate. The sensors may similarly provide accurate road grade information based on detecting the vehicle location and matching the vehicle location to a known road map.

In some embodiments, qualifying brake apply module 205 is configured to determine that a braking event is a qualifying brake application when the current vehicle mass is nominal (e.g., not overloaded), the road grade is substantially flat, the rotors are not wet (e.g., wipers off, rain sensor does not detect water), the road friction coefficient is high, the brakes are burnished, and the brake torque request indicates a sustained constant deceleration. In some embodiments, qualifying brake apply module 205 omits some of these considerations.

Torque estimation module 210 is configured to receive vehicle condition data 305, to receive brake apply qualification determination 310, and to generate estimated specific torque 315. Torque estimation module 210 uses brake pressure and vehicle deceleration feedback to estimate real-time specific torque. In the example provided, torque estimation module calculates estimated specific torque 315 at specific brake temperatures and ambient humidity values to learn the brake system dependency on brake temperature and ambient humidity, which can vary between different brake pad and rotor combinations. As described below, estimated specific torque 315 may be calculated to learn dependency on brake pressure in addition to ambient humidity and brake temperature. Accordingly, control system 100 provides an ability to "learn" after-market brake hardware specific torque and brake temperature/ambient humidity dependency.

In the example provided, torque estimation module 210 calculates estimated specific torque 315 according to the equation:

$$\text{Specific Torque} = \frac{\text{Vehicle Mass} * \text{Deceleration} * \text{Tire Radius}}{\text{Brake Pressure}} \quad \text{(eq. 1)}$$

In some embodiments, deceleration refers to deceleration of the vehicle due to the brake system. For example, when vehicle condition data 305 provides a total vehicle deceleration relative to the road, then torque estimation module 210 may modify the total vehicle deceleration based on road grade information (e.g., add or subtract acceleration due to gravity) to obtain the deceleration due to the brake system. In some embodiments, a substantially non-zero road grade may disqualify the braking operation from being a qualifying brake apply, and the deceleration may be assumed to be due to the brake system even when vehicle condition data 305 provides a total vehicle deceleration relative to the road.

Threshold comparison module 215 is configured to receive vehicle condition data 305 and current specific torque 320. Threshold comparison module 215 is configured to generate update database indicator 325. Threshold comparison module 215 compares estimated specific torque 315 to current specific torque 320. When estimated specific torque 315 varies from current specific torque 320 by more than a threshold amount, threshold comparison module 215 generates update database indicator 325.

Current specific torque database 220 is configured to store and generate current specific torque 320, to receive estimated specific torque 315, to receive update database indicator 325, to receive specific torque reset indicator 340, and to receive initial specific torque value 345. Current specific torque database replaces current specific torque 320 with estimated specific torque 315 in response to receiving update database indicator 325. Current specific torque database 220 replaces current specific torque 320 with initial specific torque value 345 in response to receiving specific torque reset indicator 340. In the example provided, current specific torque database 220 is non-volatile random access memory (NVRAM) that stores the current specific torque across key cycles of the vehicle. The current specific torque may be stored as specific torque values, as a deviation value or percent from the initial specific torque value, or as any other indicator that may be used to calculate the specific torque value.

Figure 3:
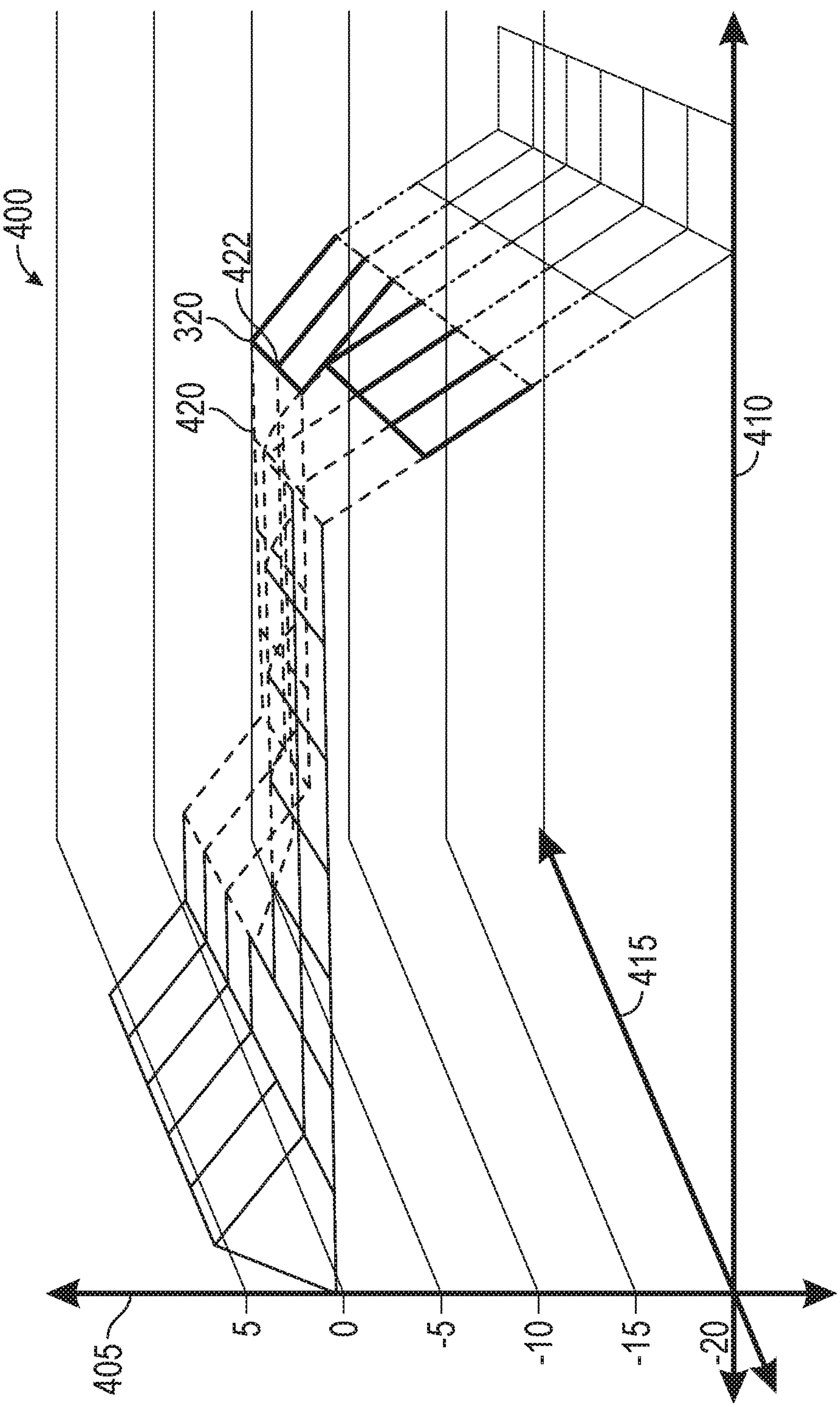
FIG. 3 is a graph illustrating a specific torque adjustment map, in accordance with various embodiments.

Referring now to FIG. 3, and with continued reference to FIGS. 1-2, a specific torque adjustment map 400 is illustrated in accordance with various embodiments. In the example provided, current specific torque 320 is stored in a three dimensional lookup table as a percent variation 405 at specific brake temperatures 410 and ambient humidity values 415. For example, estimated specific torque 315 may be stored as current specific torque 320 indicating a −5% change from initial specific torque value 345 at a specified brake temperature and ambient humidity.

In some embodiments, the amount of change to specific torque adjustment map 400 from any single received estimated specific torque 315 is limited to improve robustness and reduce the impact of outlier estimations. In some embodiments, a learned difference at a particular point on the map is used to adjust surrounding points as well. For example, when estimated specific torque 315 indicates that current specific torque 320 should move from 0% to −5% difference from initial specific torque value 345, surrounding points 420 and 422 may be adjusted to the negative direction (e.g., to −2.5%) when the surrounding points 420 and 422 do not yet have any supporting measurements. In some embodiments, the total amount of allowed deviation between the initial specific torque and the current specific torque is bounded (e.g., limited to 25% deviation).

In the example provided, specific torque adjustment map 400 is learned gradually over the course of days or weeks of driving. It should be appreciated that the rate of learning may be adjusted in any particular implementation, and may be accelerated based on receiving the specific torque reset indicator 340 without departing from the scope of the present disclosure.

In some embodiments, the control system accounts for nonlinear relationships between brake pressure and brake torque due to offsets and varying gain with input pressure. For example, the control system may create multiple specific torque adjustment maps 400, with each specific torque adjustment map 400 being applicable to a specified range of brake pressures to account for nonlinearities as a function of pressure in addition to as a function of temperature and humidity as described above. It should be appreciated that other methods of storing and looking up specific torque data as a function of temperature, humidity, and brake pressure may be utilized without departing from the scope of the present disclosure.

Referring again to FIG. 2, and with continuing reference to FIGS. 1 and 3, fault indication module 225 receives estimated specific torque 315 and generates fault data 330. Fault indication module 225 compares estimated specific torque 315 with threshold values, such as government regulated minimum specific torque values or specific torque values that may indicate faulty brake hardware. Fault data 330 indicates that estimated specific torque 315 is outside of the threshold values. A maintenance module 230 receives fault data 330 for indicating to a driver/passenger or to controller 34 that brake system maintenance should be performed. Accordingly, fault indication module 225 may be used for continuous monitoring of brake hardware performance and may alert the driver and/or control system if performance degrades beyond a set limit.

Service reset module 235 receives service reset request 335 and generates specific torque reset indicator 340. For example, service reset request 335 may be entered by a technician who changed brake pads and/or rotors of brake system 26. In some embodiments, sensor system 28 may detect removal of brake pads and/or rotors and service reset module 235 may generate service reset request 335. Specific torque reset indicator 340 instructs current specific torque database 220 to replace current specific torque 320 with initial specific torque value 345.

Initial specific torque database 240 stores and generates initial specific torque value 345. For example, initial specific torque value 345 may indicate the specific torque for brake system hardware installed by the manufacturer of vehicle 10.

Brake torque request module 250 generates brake torque request 350. For example, brake torque request module 250 may generate brake torque request 350 in response to controller 34 determining that a vehicle in front of vehicle 10 is decelerating. In some embodiments, brake torque request module 250 indicates an amount of deceleration to be achieved as a coefficient of the acceleration due to gravity on Earth (G). In some embodiments, brake torque request module 250 indicates a torque value to be achieved by brake system 26. Brake pressure module 255 receives current specific torque 320, receives brake torque request 350, and generates brake pressure value 355 for brake system 26. Brake torque request module 250 calculates brake pressure value 355 needed to achieve brake torque request 350 based on current specific torque 320, as will be appreciated by those with ordinary skill in the art. As used herein, brake pressure refers to the hydraulic pressure within brake system 26. Brake pressure may be known as corner pressure or wheel pressure.

Figure 4A:
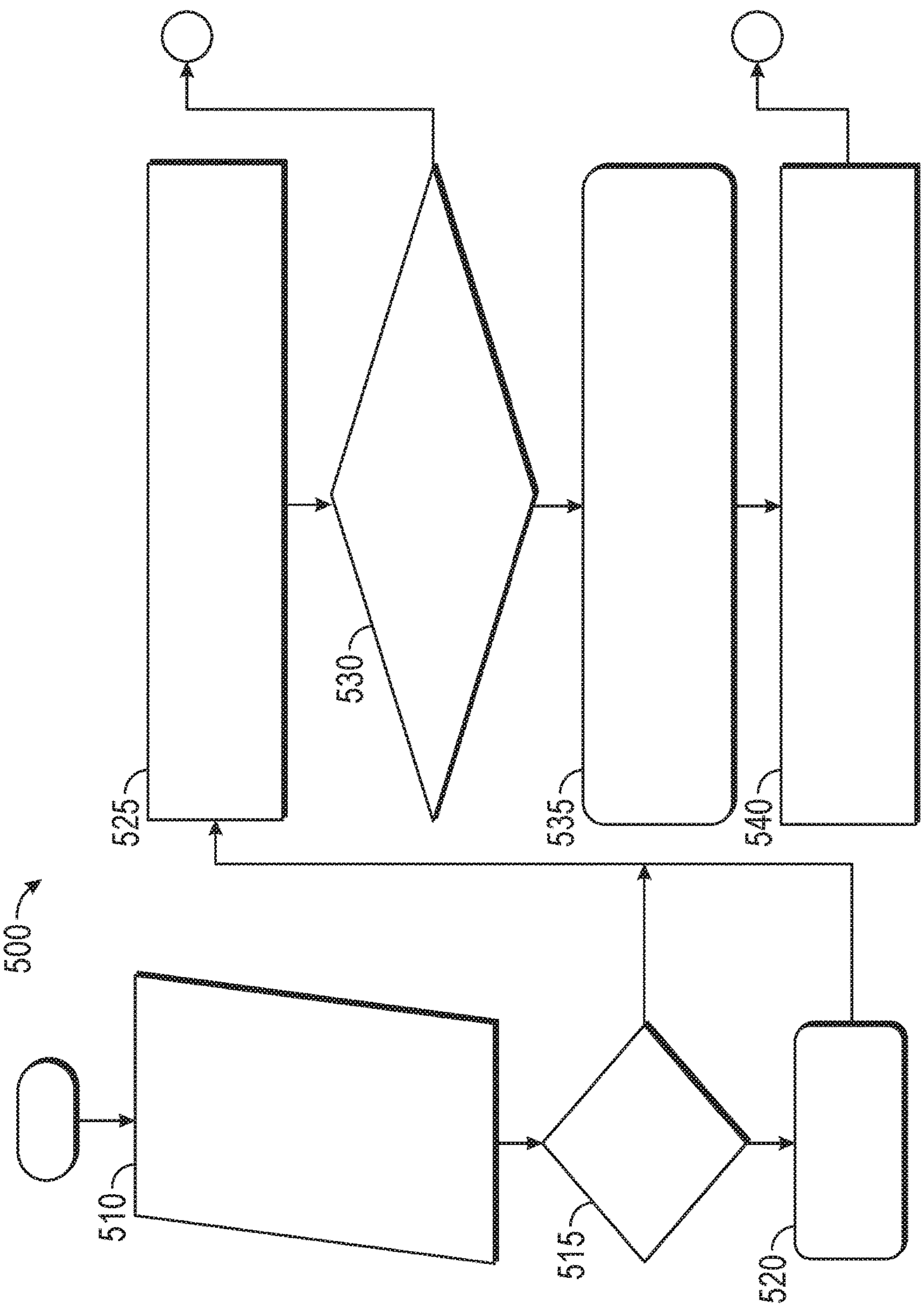
FIGS. 4A and 4B combine to form FIG. 4, which is a flowchart illustrating a control method for controlling the autonomous vehicle, in accordance with various embodiments.
Figure 4B:
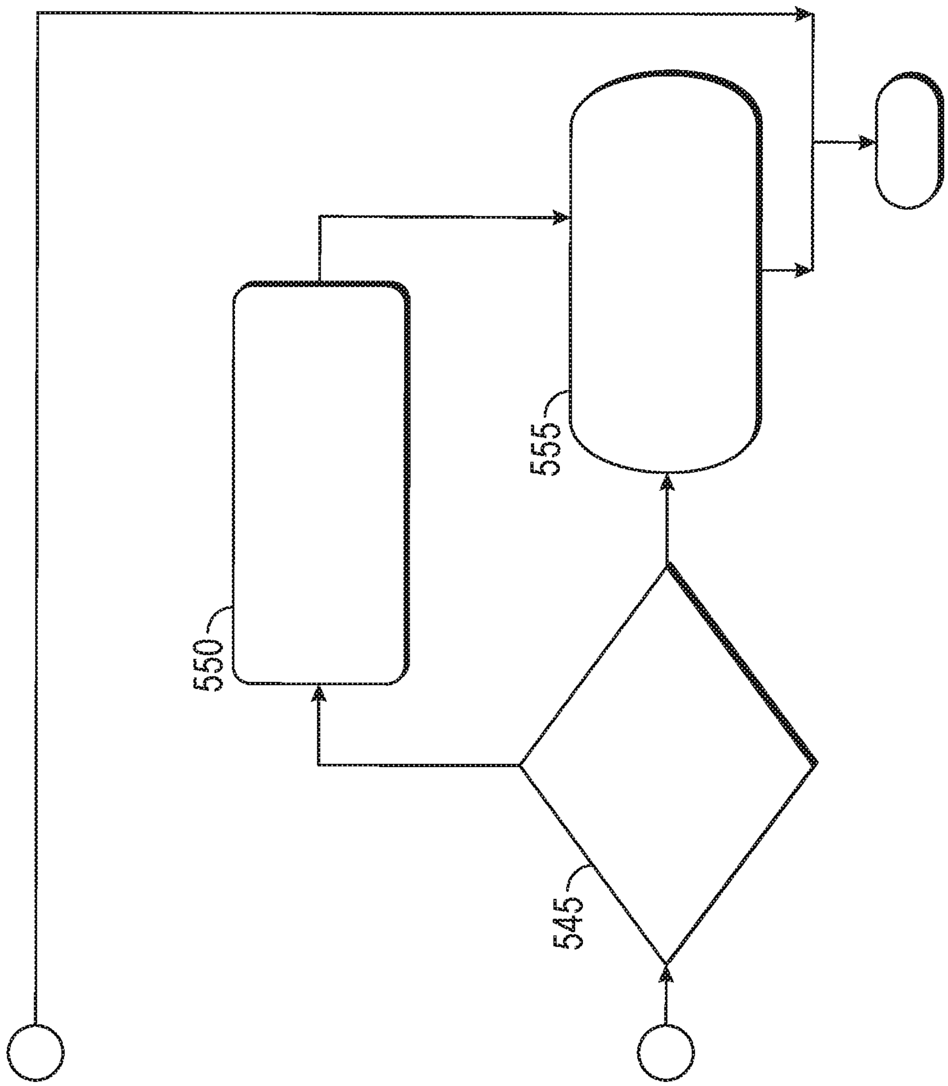

Referring now to FIG. 4, and with continued reference to FIGS. 1-3, a flowchart illustrates a control method 500 for using a specific torque of a brake system for a vehicle that can be performed by the control system 100 of FIG. 2 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 500 can be scheduled to run based on one or more predetermined events, and/or can run continuously during operation of the vehicle 10.

In general, method 500 is an algorithm that monitors a brake pressure to vehicle deceleration relationship under certain conditions to continually estimate the current brake pressure to brake torque conversion factor (specific torque). This allows the algorithm to gradually compensate for system wear and aftermarket brake hardware. In the case of an autonomous vehicle, the algorithm uses available inputs such as road grade and occupant/loading estimates to determine when the vehicle is in a nominal condition (e.g., level road and substantially lightly loaded vehicle weight) appropriate for specific torque learning. The algorithm can also use brake temperature and humidity inputs to learn the brake system dependency on these factors, which may vary between different pad/rotor combinations.

Control system 100 receives vehicle condition inputs in task 510. For example, qualifying brake apply module 205 and torque estimation module 210 may receive vehicle condition data 305. Vehicle condition data 305 indicates a brake pressure of the brake system during a braking operation and a deceleration of the vehicle during the braking operation.

Control system 100 determines whether a service reset is indicated in task 515. For example, service reset module 235 may generate specific torque reset indicator 340 in response to receiving service reset request 335. When there is not a service reset request, method 500 proceeds to task 525. When there is a service reset request, method 500 proceeds to task 520.

Control system 100 resets the specific torque to an initial specific torque value in response to receiving a service reset request indicating a change of hardware in the brake system in task 520. For example, current specific torque database 220 may store initial specific torque value 345 as current specific torque 320 in response to receiving specific torque reset indicator 340.

Control system 100 analyzes a braking operation in task 525. Control system 100 determines whether the braking operation is a qualifying brake application that is suitable for learning the specific torque in task 525. For example, qualifying brake apply module 205 may generate brake apply qualification determination 310 in response to determining that the brake application is suitable for learning the specific torque. In some embodiments, control system 100 determines whether the braking operation is a qualifying brake operation is based on a vehicle mass, a road grade, a rain status, a road surface coefficient, a brake burnish status, and a rate of change of the deceleration.

When the brake application is not a qualifying brake application, method 500 ends. When the brake application is a qualifying brake application, method 500 proceeds to task 535. Control system 100 estimates a specific torque of the brake system based on the brake pressure and the deceleration in task 535 in response to determining that the braking operation is the qualifying brake application. For example, specific torque estimation module 210 may generate estimated specific torque 315.

Control system 100 compares the specific torque to an initial specific torque value and stores the specific torque in response to determining that the specific torque is outside of a threshold percent of the initial specific torque value. For example, threshold comparison module 215 may cause current specific torque database 220 to replace current specific torque 320 with estimated specific torque 315. In some embodiments, the control system stores the specific torque as a deviation percent from an initial specific torque value in a three dimensional lookup table based on a brake temperature and an ambient humidity during the braking operation.

Control system 100 compares the specific torque to a fault threshold in task 545. For example, fault indication module 225 may compare estimated specific torque 315 to a threshold. When the specific torque is within the fault threshold, method 500 proceeds to task 555. When the specific torque is outside of the fault threshold, method 500 proceeds to task 550.

Control system 100 indicates a brake system fault in response to the specific torque extending beyond the fault threshold in task 550. For example, fault indication module 225 may generate fault data 330.

Control system 100 operates the vehicle based on the specific torque in task 555. For example, brake pressure module 255 may convert brake torque request 350 to brake pressure value 355 based on current specific torque 320.

Accordingly, the method may increase the accuracy of a feed forward control term in autonomous driving systems featuring a brake torque interface to the brake system. The method may further provide consistent brake feel even when installing aftermarket brake hardware (e.g. pads or rotors) results in a significant change in specific torque. The method may further increase consistency in autonomous braking performance in the presence of system wear and/or aftermarket hardware.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of using a specific torque of a brake system for a vehicle, the method comprising:

determining a brake pressure of the brake system during a braking operation;

determining a deceleration of the vehicle during the braking operation;

determining a vehicle mass and a wheel radius of the vehicle;

estimating a specific torque of the brake system based on the brake pressure, the vehicle mass, the wheel radius, and the deceleration;

storing the specific torque based on a brake temperature and an ambient humidity during the braking operation, and operating the vehicle based on the specific torque.

2. The method of claim 1, further comprising determining whether the braking operation is a qualifying brake application that is suitable for learning the specific torque, and wherein estimating the specific torque is in response to determining that the braking operation is the qualifying brake application.

3. The method of claim 2, wherein determining whether the braking operation is a qualifying brake operation is based on a vehicle mass, a road grade, a rain status, a road surface coefficient, a brake burnish status, and a rate of change of the deceleration.

4. The method of claim 1, further comprising resetting the specific torque to an initial specific torque value in response to receiving a service reset request indicating a change of hardware in the brake system.

5. The method of claim 1, wherein estimating the specific torque includes estimating the specific torque as:

$$\text{Specific Torque} = \frac{\text{Vehicle Mass} * \text{Deceleration} * \text{Tire Radius}}{\text{Brake Pressure}}$$

6. The method of claim 1, wherein storing the specific torque includes storing the specific torque in a three dimensional lookup table.

7. The method of claim 1, wherein storing the specific torque includes storing the specific torque as a deviation percent from an initial specific torque value.

8. The method of claim 7, wherein storing the specific torque is in response to determining that the specific torque is within a threshold percent of the initial specific torque value.

9. The method of claim 1, further comprising:

comparing the specific torque to a fault threshold; and indicating a brake system fault in response to the specific torque being equal to or greater than the fault threshold.

10. The method of claim 1, wherein the brake pressure is a hydraulic brake pressure.

11. A vehicle system for controlling a vehicle with a brake system, the vehicle system comprising:

a sensor system configured for determining a vehicle mass, a wheel radius, and a deceleration of the vehicle during a braking operation;

a brake pressure module configured for determining a brake pressure of the brake system during a braking operation;

a torque estimation module for estimating a specific torque of the brake system based on the vehicle mass, the wheel radius, the brake pressure, and the deceleration, wherein the torque estimation module is configured for storing the specific torque based on a brake temperature and an ambient humidity during the braking operation; and the brake system for operating the vehicle based on the specific torque.

12. The vehicle system of claim 11, further comprising:

a qualifying brake apply module configured for determining whether the braking operation is a qualifying brake application that is suitable for learning the specific torque, and wherein the torque estimation module is configured for estimating the specific torque in response to determining that the braking operation is the qualifying brake application.

13. The vehicle system of claim 12, wherein the qualifying brake apply module is configured for determining whether the braking operation is a qualifying brake operation based on a vehicle mass, a road grade, a rain status, a road surface coefficient, a brake burnish status, and a rate of change of the deceleration.

14. The vehicle system of claim 11, further comprising a service reset module for resetting the specific torque to an initial specific torque value in response to receiving a service reset request indicating a change of hardware in the brake system.

15. The vehicle system of claim 11, wherein the torque estimation module is configured for estimating the specific torque as:

$$\text{Specific Torque} = \frac{\text{Vehicle Mass} * \text{Deceleration} * \text{Tire Radius}}{\text{Brake Pressure}}.$$

16. The vehicle system of claim 11, wherein storing the specific torque is in response to determining that the specific torque is within a threshold percent of the initial specific torque value.

17. The vehicle system of claim 11, wherein the torque estimation module is configured for storing the specific torque as a deviation percent from an initial specific torque value.

18. A vehicle, comprising:

a sensor system configured for determining a vehicle mass, a wheel radius, and a deceleration of the vehicle during a braking operation;

a brake system; and a control system comprising:

a brake pressure module configured for determining a brake pressure of the brake system during a braking operation;

a qualifying brake apply module configured for determining whether the braking operation is a qualifying brake application that is suitable for learning the specific torque, wherein determining whether the braking operation is a qualifying brake operation is based on a vehicle mass, a road grade, a rain status, a road surface coefficient, a brake burnish status, and a rate of change of the deceleration; and a torque estimation module for estimating a specific torque of the brake system based on the vehicle mass, the wheel radius, the brake pressure, and the deceleration wherein the torque estimation module is configured for estimating the specific torque in response to determining that the braking operation is the qualifying brake application, and wherein the brake system is configured for operating the vehicle based on the specific torque.

* * * * *